United States Patent
Golovashkin et al.

(10) Patent No.: US 9,047,566 B2
(45) Date of Patent: Jun. 2, 2015

(54) QUADRATIC REGULARIZATION FOR NEURAL NETWORK WITH SKIP-LAYER CONNECTIONS

(71) Applicant: Oracle International Corporation, Redwood Shores, CA (US)

(72) Inventors: Dmitry Golovashkin, Belmont, CA (US); Patrick Aboyoun, Seattle, WA (US); Vaishnavi Sashikanth, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 251 days.

(21) Appl. No.: 13/795,613

(22) Filed: Mar. 12, 2013

(65) Prior Publication Data
US 2014/0279771 A1    Sep. 18, 2014

(51) Int. Cl.
*G06E 1/00*    (2006.01)
*G06N 3/04*    (2006.01)

(52) U.S. Cl.
CPC .................................... *G06N 3/04* (2013.01)

(58) Field of Classification Search
None
See application file for complete search history.

(56) References Cited

U.S. PATENT DOCUMENTS

| | | | | |
|---|---|---|---|---|
| 5,649,064 | A | * | 7/1997 | Jorgensen et al. ............... 706/17 |
| 6,058,206 | A | * | 5/2000 | Kortge ........................... 382/159 |
| 2007/0269804 | A1 | * | 11/2007 | Liew et al. ......................... 435/6 |
| 2013/0282635 | A1 | * | 10/2013 | Dull et al. ....................... 706/25 |

* cited by examiner

*Primary Examiner* — Alan Chen
(74) *Attorney, Agent, or Firm* — Hickman Palermo Becker Bingham LLP

(57) ABSTRACT

According to one aspect of the invention, target data comprising observations is received. A neural network comprising input neurons, output neurons, hidden neurons, skip-layer connections, and non-skip-layer connections is used to analyze the target data based on an overall objective function that comprises a linear regression part, the neural network's unregularized objective function, and a regularization term. An overall optimized first vector value of a first vector and an overall optimized second vector value of a second vector are determined based on the target data and the overall objective function. The first vector comprises skip-layer weights for the skip-layer connections and output neuron biases, whereas the second vector comprises non-skip-layer weights for the non-skip-layer connections.

20 Claims, 4 Drawing Sheets

---

Input: $\mathcal{A} \geq 1$ number of $\alpha$ interval partitions, $\mathcal{B} \geq 1$ number of $\beta$ interval partitions, lower $L$ and upper $U$ bounds on the $w$ vector.
1: Initialize the incumbent solution $(v^*, w^*)$ where $v^*$ is the solution to the linear regression model (2) $\alpha = \beta = 0$, and $w^*$ is a random vector, such that $L \leq w^* \leq U$,
2: $F_n^* \leftarrow F_n(v^*, w^*)$
3: Estimate the least eigenvalue $\lambda$ of the Hessian matrix $\nabla^2 F_n$, and assign $\Lambda = \max\{0, -\min_{k,v,L \leq w \leq U} \lambda_k(\nabla^2(F_n))\}$, where $\lambda_k$ is $k$-th eigenvalue of the Hessian matrix.
4: for $\alpha \leftarrow \{0, 1/\mathcal{A}, \ldots, 1\}$ do
5:    for $\beta \leftarrow \{\Lambda, \Lambda(\mathcal{B}-1)/\mathcal{B}, \ldots, 0\}$ do
6:       Solve regularized neural network model in expression (1)
7:       if $F_n(v, w) < F_n^*$ then
8:          $F_n^* \leftarrow F_n(v, w)$
9:          $(v^*, w^*) \leftarrow (v, w)$
10:      end if
11:   end for
12: end for
Output: $(v^*, w^*)$, $F_n^*$

Input: $\mathcal{A} \geq 1$ number of $\alpha$ interval partitions, $\mathcal{B} \geq 1$ number of $\beta$ interval partitions, lower $L$ and upper $U$ bounds on the $w$ vector.

1: Initialize the incumbent solution $(v^*, w^*)$ where $v^*$ is the solution to the linear regression model (2) $\alpha = \beta = 0$, and $w^*$ is a random vector, such that $L \leq w^* \leq U$,
2: $F_n^* \leftarrow F_n(v^*, w^*)$
3: Estimate the least eigenvalue $\lambda$ of the Hessian matrix $\nabla^2 F_n$, and assign $\Lambda = \max\{0, -\min_{k,w,L \leq w \leq U} \lambda_k(\nabla^2(F_n))\}$, where $\lambda_k$ is $k$-th eigenvalue of the Hessian matrix.
4: for $\alpha \leftarrow \{0, 1/\mathcal{A}, \ldots, 1\}$ do
5:    for $\beta \leftarrow \{\Lambda, \Lambda(\mathcal{B}-1)/\mathcal{B}, \ldots, 0\}$ do
6:       Solve regularized neural network model in expression (1)
7:       if $F_n(v, w) < F_n^*$ then
8:          $F_n^* \leftarrow F_n(v, w)$
9:          $(v^*, w^*) \leftarrow (v, w)$
10:       end if
11:    end for
12: end for

Output: $(v^*, w^*)$, $F_n^*$

QUADRATIC REGULARIZATION FOR NEURAL NETWORK WITH SKIP-LAYER CONNECTIONS

TECHNICAL FIELD

The present invention relates to neural networks and, more specifically, to neural network based data analysis techniques.

BACKGROUND

Modeling data patterns and relationships with neural networks often requires dealing with non-convex optimization problems. However, a non-convex optimization problem may and often possesses multiple local minima. The difference between a local minimum and the global minimum in the non-convex optimization problem can be significant. Some optimization techniques resort to starting and restarting non-linear optimization at random initial points in a hope to get sufficiently close to or even locate the global minimum (or optimum), although the chances of actually capturing the global minimum often are negligibly small due to a myriad of reasons including multiple local minima, numerical instability, etc. Another frequent concern is that a de-trending pre-processing may need to be performed over to-be-analyzed target data before it is used in modeling complex data patterns that may be mixed with an overall linear trend with neural networks. Indeed, if target data exhibits a strong linear trend, a neural-network based data analysis may not perform any better than a linear regression analysis.

Additionally, some techniques require significant subjective user involvements, generate solutions overly sensitive to noisy data, and frequently lead to incorrect solutions.

Based on the foregoing, there is a need for developing neural network data analysis techniques that mitigate these effects and difficulties.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates a listing of an example algorithm.

DETAILED DESCRIPTION

Figure 1:
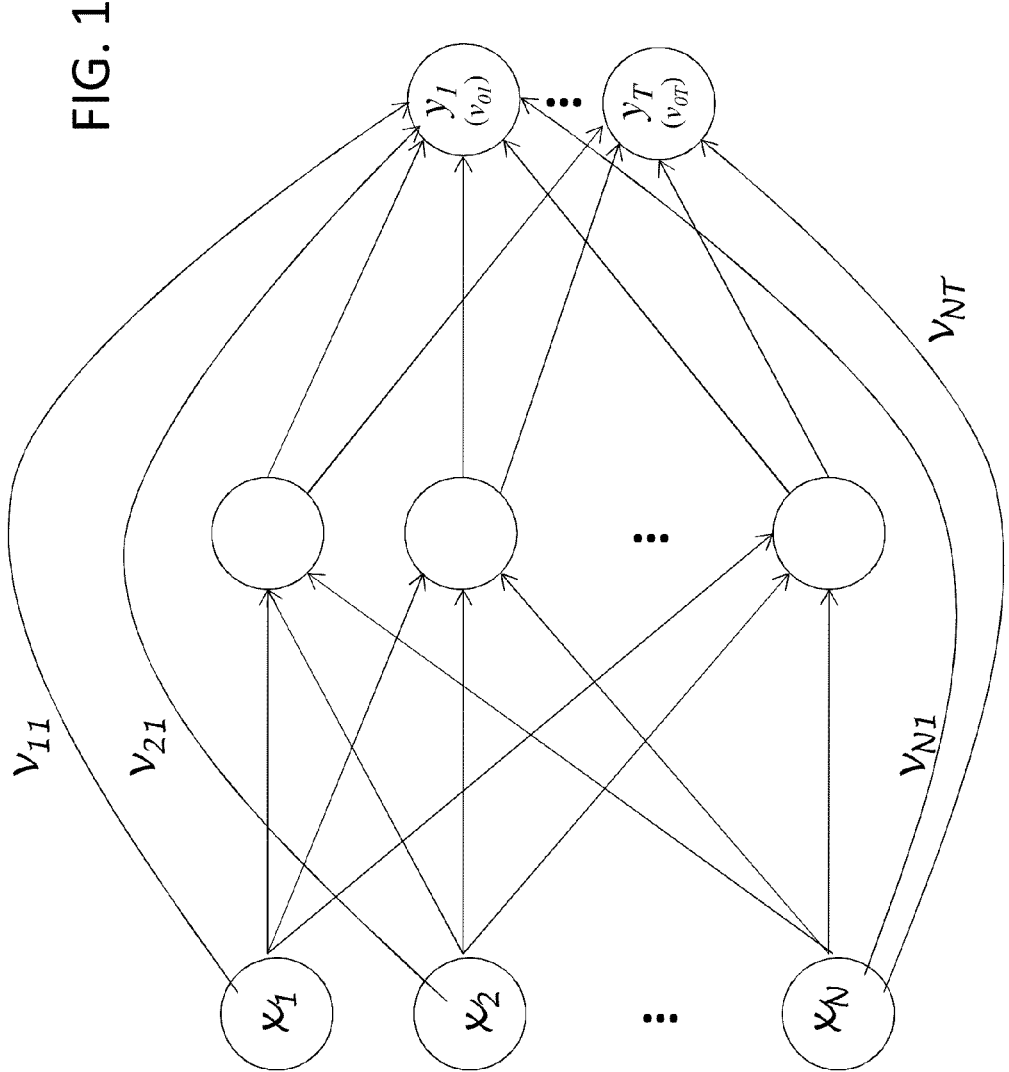
FIG. 1 illustrates an example neural network.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In a real world problem, multiple types of data patterns and relationships may exist in to-be-analyzed target data. For example, many factors may influence grain production. A factor like acreage may have an overall unbounded data relationship (e.g., linear relationship or trend) with grain yield. Other factors such as seasonable factors may have complex, non-linear (bound or even unbounded) relationships with the grain yield.

Under other approaches, the target data would be de-trended first so that the portion of the target data embodying the overall unbounded data relationship or trend is removed from the target data. The de-trended target data would be normalized and then set as new target data for further analysis. The new target data may be analyzed for multiple times with neural networks. Tentative neural network models may need to be changed multiple times in a hope to generate a good neural network that well represents the complex, non-linear relationships in the new target data.

An objective function (or an error function, a cost function, etc.) can be defined to provide a measure of errors or differences between what is predicted by a data analysis model such as a neural network and what is observed (which may contain noises). For example, a set of optimized weights for a neural network may correspond to a globally minimal value of the neural network's objective function.

Under other approaches, random (perhaps small) initial values may be assigned to weights as a starting point of a search for a solution to an objective function. Due to the presence of multiple local minima, non-convexity, noisy data and numerical instability, however, the chance of ending up with the global minimum is often negligible in those other approaches. The search may be trapped in a local minimum close to the starting point, or may not lead to a solution at all because of numerical instability and non-convexity. Even if found, a solution may actually be wildly apart from the global minimum with a large magnitude difference.

Under other approaches, to improve numeric stability of the solution and to throw away large weight magnitude solutions, a penalty (or weight decay) term with a weight decay factor may be introduced into an objective function to penalize or reduce the magnitudes of weights. Setting a proper weight decay factor value, however, is often elusive, and often heavily depends on practitioners' subjective knowledge, experiences and adopted methods relative to optimization problems to be solved. A too small weight decay factor value is not effective to resolve issues of multiple local minima, numeric instability, non-convexity, etc. A too large weight decay factor value makes the penalty term so dominant in the objective function as to mask the true solution and provide no confidence to a generated solution whether it is in fact correct or even close to the true solution.

Techniques as described herein provide a novel framework in which two goals are simultaneously and automatically accomplished. The framework uses a regularized objective function (or an overall objective function) newly defined for a neural network comprising skip-layer connections. The regularized objective function includes not only a term corresponding to the neural network's unregularized objective function, but also additional terms specifically designed to address the two goals mentioned above.

First, the regularized objective function comprises a weighted skip-layer and output bias term based on (a) weights for the skip-layer connections and (b) output biases for the output neurons, of the neural network. This term is used to accomplish the first goal of de-trending the target data simultaneously and automatically in a solution to the minimization problem of the regularized objective function, without the need for additional de-trending preprocessing on the target data as under other approaches. This term is closely related to linear regression, represents a linear regression unit with or within an overall neural network formulation, and is included in the regularized objective function regardless of the choice of activation functions such as output activation functions for output neurons of the neural network. Based at least in part on this term, optimized values for non-skip-layer weights, skip-layer weights and output biases in the neural network may be searched within solutions to the minimization problem of the regularized objective function, directly using the target data without de-trending preprocessing.

Second, the regularized objective function includes a term comprising convex underestimators (e.g., convex quadratic underestimators) with respect to weights (other than the weights for the skip-layer connections and the output biases for the output neurons) for non-skip-layer connections in the neural network. The convex underestimators provides a convexification and stabilization mechanism for the neural network's unregularized objective function, thereby accomplishing the second goal of regularizing the typically non-convex unregularized objective function of the neural network. As will be further explained, the amount of regularization from the convex underestimators can be controlled so it scales with a measure of non-convexity of the neural network's unregularized objective function. Convex relaxation techniques can be used to generate lower bound values with respect to weights for the non-skip-layer connections.

Specifically, a regularized objective function as described herein may comprise three terms. The first term, or the aforementioned skip-layer weight and output bias term, can be a norm (e.g., a L2 norm) comprising the skip-layer weights and output biases as arguments, and represents a linear regression unit in the regularized objective function. The second term is the neural network's unregularized objective function term based on weights for both the skip-layer connections and the non-skip-layer connections and activation functions of neurons, in the neural network. The third term, or the (e.g., quadratic) regularization term comprising the aforementioned convex underestimators, can be configured to provide a convexification and stability mechanism for the second term with respect to the weights for the non-skip-layer connections in the neural network. Each of these terms can be multiplied with a respective scaling factor that is iterated over a number of candidate values in an automated data analysis process.

Under other approaches, a weight decay factor with a penalty term is often set to an arbitrary (e.g., too small, too large, etc.) value in a wide range between 0 and positive infinity. Under techniques as described herein, in contrast, the scaling factor for the third term is determined simultaneously and automatically with the optimization of the regularized objective function, and set to a value that scales with a measure of non-convexity of the neural network's unregularized objective function.

Under the other approaches, the penalty term is used to (e.g., arbitrarily, based on manual input, etc.) penalize the magnitudes of weights. Under techniques as described herein, in contrast, the third term of the regularized objective function is to convexify the second term of the regularized objective function in proportion to a measure of non-convexity of the second term.

Under the techniques as described herein, an overall minimal value of the neural network's unregularized objective function can be searched among those corresponding to solutions of the regularized objective function within a relatively small range of the scaling factor for the third term. The regularized objective function is convex when beta is chosen via expression (6) and thus possesses a unique minimum for at least a portion of the relatively narrow range as described herein. For example, when the neural network's objective function is convex (e.g., as indicated by a Hessian matrix of the neural network's unregularized objective function does not possess a negative eigenvalue), the scaling factor for the third term can be set to zero. Even when the neural network's objective function is non-convex (e.g., when the Hessian matrix possesses at least one negative eigenvalue), the scaling factor for the third term is still set to a relatively narrow range between zero and an upper bound proportional to the magnitude of the minimum eigenvalue of the Hessian matrix of the neural network's unregularized objective function. Accordingly, much computation-intensive search for an optimized solution in a wide range of a weight decay factor and uncertainty about the correctness of the resultant solution under other approaches can be avoided by the techniques as described herein.

Consequently, the novel framework (including the novel formulation of regularized objective function) as described herein results in better/higher quality solutions and faster convergence of the underlying numerical optimization algorithm than other techniques.

Neural Networks

A neural network as described herein, which may be, but is not limited only to, a feed-forward neural network, can be represented as a weighted, directed graph, whose nodes (artificial neurons; herein "neuron") are governed by activation functions. FIG. 1 illustrates an example neural network. The neural network can comprise one or more layers of neurons, for example, input neurons (e.g., $x_1, x_2, \ldots x_N$), where N is the total number of input neurons; one or more layers of hidden (or intermediate) neurons, as represented with empty circles; and output neurons (e.g., neurons that generate output $y_1, \ldots y_T$), where T is the total number of input neurons. For the purpose of illustration only, only one layer of hidden neurons between a layer of input neurons and a layer of output neurons is shown in FIG. 1. However, in various embodiments, a neural network as described herein may but is not limited only to multiple layers of hidden neurons between a layer of input neurons and a layer of output neurons.

A neural network can be thought of as a mapping between input data sets and their respective output data sets. A neural network is defined when weights, biases and/or activation functions are known or determined. In some embodiments, some or all of the activation functions may be selected or determined based on one or more of user inputs, system configurations, runtime selection decisions, default settings, etc.

As illustrated in FIG. 1, the neural network comprises one or more skip-layer connections, each of which is a connection originating from an input neuron and terminating at an output neuron. Without loss of generality, a skip-layer weight for a skip-layer connection may be denoted as one of $v_{11}$, $v_{21}, \ldots, v_{N1}, \ldots v_{NT}$. Additionally, the neural network comprises one or more non-skip-layer connections, each of which is a connection either originating from a hidden neuron or terminating at a hidden neuron. Without loss of generality, a non-skip-layer weight for a non-skip-layer connection may be denoted as $w_i$, where i is an index value between 1 and the total number S of the non-skip-layer connections in the neural network. Additionally, the neural network comprises one or more output biases for the one or more output neurons. Without loss of generality, an output bias for an output neuron may be denoted as $v_{0T}$.

Each neuron in the neural network may, but is not required to, have a distinct activation function. In some embodiments, two or more neurons in the neural network may have the same activation function. An activation function as described herein is a function assigned to a neuron, takes weighted input values from incoming connections formed between the neuron and other neurons, and produces an output value based on the input values. Among the most popular activation functions is logistic sigmoid. Other examples of activation functions include but are not limited to hyperbolic tangent, bipolar sigmoid, arctangent, cosine, Gaussian, Gompertz, linear, sigmoid, reciprocal, sine, square, etc.

Novel Regularized Objective Function

Under techniques as described herein, a regularized objective function is used to search for globally optimized values of weights for skip-layer connections, weights for non-skip-layer connections, output biases in output neurons, etc., of a neural network, which models intricate linear and/or nonlinear relationships between target data comprising an input dataset and a corresponding output dataset.

An example class of nonlinear unconstrained optimization problems, for a neural network as illustrated in FIG. 1, can be solved with a novel regularized objective function F(v, w) that comprises (a) a first part corresponding to linear regression, (b) a second part corresponding to an unregularized objective function of the neural network, and (c) a third part corresponding to regularization, as shown in the following expression:

$$\min_{v,w} F(v, w) = (1 - \alpha)F_r(v) + \alpha F_n(v, w) + \frac{1}{2}\beta\langle w - L, w - U\rangle \quad (1)$$

$$\alpha \in [0, 1], \beta \in [0, +\infty)$$

where $\alpha$ and $\beta$ are two factors within their respective numeric value ranges as indicated in expression (1) above; v is a first vector representing skip-layer weights and output neuron biases; and w is a second vector representing the remaining neural network weights (e.g., weights for non-skip-layer connections).

As readily seen, the regularized objective function F(v, w) is at least convex for $\alpha=0$. As $\alpha$ increases, F(v, w) will increasingly capture nonlinear effects of the neural network objective; and with $\alpha=1$, $\beta=0$, F(v, w) corresponds to a classic (e.g., feed-forward) neural network data analysis model.

Linear Regression

The first term on the RHS of expression (1) is a skip-layer weight and output bias term, and represents a linear regression unit in the regularized objective function. The first term can be defined as a product of a first scaling factor $(1-\alpha)$ and a function $F_r(v)$ related to linear regression. In some embodiments, $F_r(v)$ is norm (e.g., a L2 norm) comprising the skip-layer weights and the output biases in the neural network, as shown in the following expression:

$$F_r(v) = \frac{1}{2}\sum_{m=1}^{M}\sum_{t=1}^{T}\left(y_{mt} - \sum_{n=1}^{N}x_{mn}v_{nt} - v_{0t}\right)^2 \quad (2)$$

where M is the number of rows of an observation matrix X comprising a set of input neuron columns that store the input dataset of the target data and a set of output neuron columns that store the output dataset of the target data; N is the number of input neurons (or nodes); T is the number of neural network output neurons; $x_{mn}$ represents n-th input neuron column value of m-th row in the observation matrix X and an observed input value for n-th input neuron in m-th observation; $y_{mt}$ represents t-th output neuron column value of m-th row in the observation matrix X and an observed input value for t-th output neuron in m-th observation; $v_{0t}$ is t-th output neuron bias; and $v_{nt}$ is the corresponding skip-layer (regression) weight (coefficient).

Each column in (N+T) columns of X represents a distinct neuron among the input and output neurons. Each row in X represents a sample of (e.g., observed) input values for the input neurons in the input dataset of the target data and their corresponding (e.g., observed) output values for the output neurons in the output dataset of the target data.

The target data may exhibit a strong linear trend. Under some approaches, data preprocessing is performed to de-trend the target data. Under these approaches, the de-trended target data, rather than the target data itself, is used to determine optimized values for weights and biases of a neural network.

In sharp contrast, under techniques as described herein, unbounded data relationships between the input dataset and the output dataset in the target data may be directly represented and captured by the regularized objective function through the first term in expression (1) without de-trending preprocessing of the target data.

Unregularized Objective Function

The second term on the RHS of expression (1) is a neural network's unregularized objective function term based on weights for both the skip-layer connections and the non-skip-layer connections and activation functions of neurons, in the neural network. The second term can be defined as a product of a second scaling factor $\alpha$ and a function $F_n(v, w)$.

In some embodiments, $F_n(v, w)$ is the neural network's un-regularized neural network objective function and can be used to capture non-linear relationships that may exist in the target data between the input dataset and the output dataset.

In some embodiments, to avoid the problem of unstable convergence, some, most, or all of activation functions selected for neurons are non-linear and have bounded value ranges. What is characteristic to the bounded, non-linear activation functions is that they are non-convex, according to the following well-established theorem:

A bounded non-constant function $f: R^n \to R^1$ is non-convex. (3)

Consequently, direct optimization of neural networks' unregularized objective functions frequently leads to non-convex optimization problems, which may and often possess multiple local minima among other problems.

Regularization Relative to Non-Skip-Layer Weights

The third term on the RHS of expression (1) is a (e.g., quadratic) regularization term configured to provide a convexification and stability mechanism for the second term of the regularized objective function with respect to the weights for the non-skip-layer connections in the neural network. The third term comprises a regularization function (e.g., a quadratic regularization function, a twice differentiable regularization function, etc.), and in some embodiments, can be specifically defined as a product of a third scaling factor $\beta$ and a quadratic regularization function $\frac{1}{2}<w-L, w-U>$ where:

$$\langle w-L, w-U \rangle \equiv \sum_{s=1}^{S} (w_s - L_s)(w_s - U_s) \quad (4)$$

where S is the total number of non-skip-layer weights in the vector w; $w_s$ is s-th non-skip-layer weight in the vector w; $L_s$ is a vector component in the lower bound (vector) L and represents the lower bound for s-th non-skip-layer weight in the vector w; and $U_s$ is a vector component in the upper bound (vector) U and represents the upper bound for s-th non-skip-layer weight in the vector w.

Under other approaches, varying the value of a weight decay factor $\gamma$ with a penalty term $$\left( e.g., \frac{1}{2}\gamma \sum_{s=1}^{S} w_s^2 \right)$$

could provide an ability to control or limit the magnitudes of weights in an objective function, with or without the explicit constraints over the weights. However, it is worth noting that the magnitudes of weights such as the weights in the vector w can be relatively easily controlled via explicit gradient projection onto the bound (box) constraints L and U. Here, the lower bound vector L and upper bound vector U can be predetermined, pre-configured beforehand, obtained at runtime, inputted by a practitioner/user, or received from another processing module, etc.

To convexify the second term with respect to non-skip-layer weights in the vector w, the scaling factor $\beta$ is determined simultaneously and automatically with the optimization of the regularized objective function F(v, w), and set to a value that scales with a measure of non-convexity of the neural network's unregularized objective function $F_n$ (v, w). Consequently, the third term of the regularized objective function convexifies or regularizes $F_n$ (v, w) in proportion to a measure of non-convexity of $F_n$ (v, w). The measure of non-convexity as described herein may be heuristically estimated through a minimal eigenvalue of a (second derivative) Hessian matrix of $F_n$ (v, w).

Optimization with the Regularized Objective Function

A regularized objective function F(v, w) with the above-described terms as illustrated in expression (1) can be used to simultaneously de-trend the target data without preprocessing and regularize a neural network's unregularized objective function $F_n$ (v, w), when used to search for optimized values of weights and biases of a neural network.

Specifically, the minimization problem of the regularized objective function F(v, w) can be solved directly based on target data under techniques as described herein, without preprocessing the target data for de-trending as under some other approaches. The inclusion in the regularized objective function F(v, w) of the first term related to linear regression and of the second term related to a neural network's unregularized objective function allows a neural network with skip-layer connections to dynamically model and represent—e.g., directly based on the target data without de-trending preprocessing—unbounded data patterns such as linear relationships as well as complex, nonlinear relationships in the target data within a single unified formulation of the regularized objective function F(v, w).

The inclusion in the regularized objective function F(v, w) of the third term related to regularization introduces convex quadratic underestimators for (non-skip-layer) weights other than weights for skip-layer connections and output neuron bias terms) into the overall formulation and serve as a convexification and stabilization mechanism for the second term of the regularized objective function that comprises an unregularized neural network objective function $F_n(v, w)$.

In some embodiments, an upper bound (denoted as $\Lambda$) may be heuristically set for the third scaling factor $\beta$ in the third term of the regularized objective function F(v, w) in expression (1) based in part on eigenvalues (e.g., the minimum eigenvalue) of the Hessian matrix $\nabla^2 (F_n)$ of the neural network's unregularized objective function $F_n(v, w)$ in the second term of the regularized objective function F(v, w). For example, when the neural network's unregularized objective function $F_n$ (v, w) is convex (e.g., when the Hessian matrix $\nabla^2 (F_n)$ does not possess a negative eigenvalue), it possesses a unique minimum and thus the upper bound $\Lambda$ for the scaling factor $\beta$ in the third term can be set to zero. On the other hand, if the unregularized objective function $F_n(v, w)$ is non-convex, or if the Hessian matrix $\nabla^2(F_n)$ comprising second derivatives of the objective function contains at least one negative eigenvalue, it can be computationally difficult to find the global minimum without regularization. In that case, the upper bound $\Lambda$ for the scaling factor $\beta$ in the third term can be set to a value proportional to the magnitude of the minimum eigenvalue of the Hessian matrix $\nabla^2(F_n)$ of the neural network's unregularized objective function $F_n(v, w)$. With the upper bound $\Lambda$ for the scaling factor $\beta$, the search for optimized values for weights and output biases through solutions to the minimization problem of the regularized objective function F(v, w) in expression (1) may be performed in a relatively small (constrained) sub-space ($\alpha \in [0, 1], \beta \in [0, \Lambda]$), rather than in a large scaling factor space ($\alpha \in [0, 1], \beta \in [0, +\infty)$).

Conceptually, with respect to non-skip-layer weights in the vector w, the regularized objective function in expression (1) represents (or can be reduced to) a quadratic perturbation of the following form:

$$f(w) + \frac{1}{2}\beta <w-L, w-U> \quad (5)$$

where the second term in expression (5) is a quadratic perturbation term serves as a convex underestimator for the first term in expression (5), which may be an arbitrary non-convex twice-differential function $f(w)$.

Convex relaxation can be performed through the second term in expression (5) to provide a lower bound on the global minimum of $f(w)$. Equivalently, convex relaxation can be performed through the third term of the regularized objective function F(v, w) to provide a lower bound on minima (or optima) of $F_n(v, w)$ with respect to the non-skip-layer weights.

Example Implementation

FIG. 2 illustrates a listing of an example algorithm for obtaining a set of optimized values for weights and biases in a neural network such as illustrated in FIG. 1 based on expression (1). This algorithm automates most if not all of a data analysis process based on a neural network with skip-layer connections. The algorithm may be executed by a neural network optimization system implemented with one or more computing devices.

A wide variety of minimization and/or search techniques including but not limited to branch and bound methods, partition-based methods, bubble search methods, etc., may be used in the algorithm of FIG. 2. The use of multiple distinct value combinations of the factors $\alpha$ and $\beta$ supports searching for optimized values of weights and biases in the neural network through progressively tighter approximations. Since expression (1) supports both convex functions and a classical neural network (when the first and third terms are zero) in a single formulation, techniques as described herein provide an efficient and automated way to search and converge to an overall optimized solution for the neural network.

Initially, the neural network optimization system may be configured to receive or establish input values for two iteration parameters $\mathcal{A}$ and $\mathcal{B}$. $\mathcal{A}$ represents the number of $\alpha$ interval partitions (or the number of iterations for values of the factor $\alpha$), whereas $\mathcal{B}$ represents the number of $\beta$ interval partitions (or the number of iteration for values of the factor $\beta$), where $\alpha$ and $\beta$ are the factors in expression (1). The neural network optimization system may also be configured to receive or establish the lower bound vector L and upper bound vector U for weights in the vector w (e.g., weights for the non-skip-layer connections of the neural network).

In line 1 of FIG. 2, the neural network optimization system is configured to initialize the vectors (v, w) to incumbent vector values (v*, w*). The incumbent vector value to the vector v, or v*, is derived as the solution to expression (1) with $\alpha$=0, $\beta$=0. With these specific $\alpha$ and $\beta$ values, F(v, w) in expression (1) is essentially reduced to a linear regression model. The incumbent vector value to the vector w, or w*, can be set to a random vector value satisfying the constraints represented by the lower and upper bound vectors L and U. As noted, L and U comprise respective lower bound and upper bound components for corresponding non-skip-layer weights in the vector w.

In line 2 of FIG. 2, the neural network optimization system is configured to obtain or set an incumbent solution $F_n^*$ to $F_n(v, w)$ using the incumbent vector values (v*, w*) For example, the vectors v and w in $F_n(v, w)$ of expression (1) can be substituted with v* and w* to obtain the incumbent solution $F_n^*$ to $F_n(v, w)$.

In line 3 of FIG. 2, the neural network optimization system is configured to estimate the least eigenvalue $\lambda$ of a Hessian matrix $\nabla^2(F_n)$—which comprises second derivatives of $F_n(v, w)$ with respect to non-skip-layer weights in the weight vector w, is diagonally symmetric, and possesses real-value eigenvalues—of the neural network's unregularized objective function $F_n(v, w)$, and set the upper bound $\Lambda$ for the factor $\beta$ to the larger of zero (0) and the magnitude of the least eigenvalue 2 of the Hessian matrix, as follows:

$$\Lambda = \max\{0, -\min_{k,v,L \leq w \leq U} \lambda_k(\nabla^2(F_n))\} \quad (6)$$

where $\lambda_k$ is the k-th eigenvalue of the Hessian matrix.

The neural network optimization system may be configured to use any of several options to estimate $\Lambda$. If the number of weights is relatively small, the neural network optimization system can be configured to compute the Hessian matrix explicitly, as described in Christopher M. Bishop, *Exact calculation of the hessian matrix for the multilayer perceptron*, Neural Computation, 4:494-501 (1992), the content of which is incorporated by reference as if originally set forth herein. The computation of the Hessian matrix may be performed on one or more sample distributions of different weights (v, w) within the constraint box as defined by the lower and upper bound vectors L and U.

Alternatively, the neural network optimization system can be configured to perform straightforward numerical estimation of eigenvalues or the minimal eigenvalue via sampling of gradients (which may be much easier to compute than computing the Hessian matrix explicitly).

Figure 3:
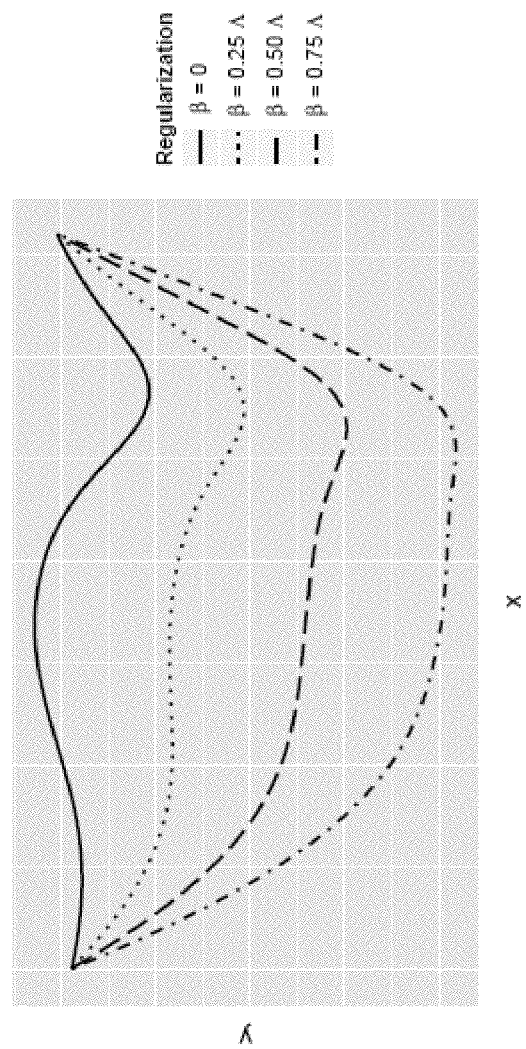
FIG. 3 illustrates example convexification effects.

Example convexification effects of scaling the factor $\beta$ in expression (1) below the upper bound $\Lambda$ are illustrated in FIG. 3, where x generally represents values of the vector w and y generally represents values of the regularized objective function in expression (1). As shown, the non-convexification effect increases as the multiplicative value in expression (1) or (5) increases.

Under other approaches, a user may have to guess a weight decay factor value in a wide range [0,+∞) for a penalty (or weight decay) term. Those other approaches aim at limiting weight magnitudes and avoid large weight magnitude solutions. More likely than not, an arbitrary or guessed weight decay factor value under those approaches either provides insufficient convexification effect thus misses the global minimum, or applies too much convexification effect thus often renders an inaccurate or incorrect solution.

In contrast, under techniques as described herein, since second derivatives are linked to curvatures, eigenvalues (e.g., the minimal eigenvalue) of the Hessian matrix comprising second derivatives of the neural network's unregularized objective function $F_n(v, w)$ are used as a measure or estimate of convexity of $F_n(v, w)$. An upper bound $\Lambda$ for the (convexification) factor $\beta$ in expression (1) may be heuristically set to a value that scales with the minimal eigenvalue the Hessian matrix. Accordingly, convexification effects from the third term in expression (1) may be much more accurately applied than the other approaches. At the same time, the search for an optimal set of weights and biases based on minimizing the regularized objective function in expression (1) may be done in a relatively small value range for the factor $\beta$ in expression (1). Costly computation over a wide range of possible values for the weight decay factor associated with weight decay under other approaches is avoided under the techniques as described herein. Additionally, user intervention in the data analysis process in terms of guessing the right decay factor value for a penalty term under other approaches is avoided or largely reduced under the techniques as described herein.

A variety of computation techniques may be used in determining or estimating the minimal eigenvalue of the Hessian matrix, including but not limited to: one or more of quasi-Newton optimization methods, the Broyden-Fletcher-Goldfarb-Shanno (BFGS) algorithms, the limited-memory BFGS (L-BFGS or LM-BFGS) algorithms, etc. In some embodiments, rather than the absolute minimum, only an estimate of the minimum eigenvalue is used for setting the upper limit for the scaling factor $\beta$. Also, a wide variety of sampling techniques may be used for populating a solution search space (e.g., sampling of the vectors v and/or w) to estimate a minimum value.

It should be noted that an upper bound $\Lambda$ as described herein may be heuristically set to be monotonously increasing with the magnitude of the minimal eigenvalue of the Hessian matrix if not all eigenvalues of the Hessian matrix is positive in any of a variety of ways. For example, the upper bound $\Lambda$ may be set as the magnitude of the minimal eigenvalue multiplied by a value in a numeric range, in a sequence of numeric values, with any value of 0.8, 1.0, 1.2, etc. if not all eigenvalues of the Hessian matrix is positive.

Referring back to FIG. 2, the neural network optimization system may be configured to use one or more of a variety of computing techniques to search for an overall minimal value of the neural network's unregularized objective function $F_n(v, w)$ among values of $F_n(v, w)$ in solutions to expression (1) with α being constrained to a first value range (e.g., between zero (0) and one (1)) and β being constrained to a second value range (e.g., between zero (0) and the upper bound Λ).

In an example embodiment as illustrated in lines 4-12 of FIG. 2, the neural network optimization system is configured to compute an individual solution to expression (1) for each distinct value combination of the factors α and β in a plurality of distinct value combinations of these factors, thereby giving rise to a plurality of individual solutions to expression (1). These distinct value combinations may be generated by varying α in a first value range, for example, between zero (0) and one (1), inclusive, and varying β in a first value range, for example, between zero (0) and the upper bound Λ, inclusive. Each individual solution to expression (1) yields a corresponding function value $F_n^*$, a corresponding vector value $v^*$ for the vector v, and a corresponding vector value $w^*$ for the vector w. Each individual solution to expression (1) may be determined or computed by solving the minimization problem of the regularized objective function F(v, w) in expression (1) based on the target data without de-trending preprocessing. A plurality of solutions to expression (1) (each solution with a different value combination of the factors α and β) yields a plurality of (corresponding) function values $F_n^*$, a plurality of (corresponding) vector values $v^*$ for the vector v, and a plurality of (corresponding) vector values $w^*$ for the vector w.

In some embodiments, the neural network optimization system is configured to select, based on one or more selection criteria, a particular function value $F_n^*$, a particular vector value $v^*$ for the vector v, and a particular vector value $w^*$ for the vector w among the plurality of (corresponding) function values $F_n^*$, the plurality of (corresponding) vector values $v^*$ for the vector v, and the plurality of (corresponding) vector values $w^*$ for the vector w as the overall optimal solution to the minimization problem of the regularized objective function F(v, w) in expression (1).

Specifically, as illustrated in lines 4, 5, 11 and 12 of FIG. 2, the neural network optimization system is configured to iterate over both the number of α interval partitions and the number of β interval partitions to generate a plurality of distinct value combinations of the factors α and β.

In line 6 of FIG. 2, the neural network optimization system is configured to compute an individual solution of the minimization problem of the regularized objective function F(v, w) in expression (1) with each distinct value combination in the plurality of distinct value combinations of the factors α and β. The computation uses the target data directly without de-trending preprocessing.

In lines 7-10 of FIG. 2, the neural network optimization system is configured to compare (a) the incumbent solution $F_n^*$ to $F_n(v, w)$ with (b) an individual function value of $F_n(v, w)$ corresponding to an individual solution of the minimization problem of the regularized objective function F(v, w) in expression (1) with a corresponding distinct value combination of the factors α and β. If the individual function value of $F_n(v, w)$ is better than the incumbent solution $F_n^*$ to $F_n(v, w)$, then the incumbent solution $F_n^*$ to $F_n(v, w)$ is replaced with the individual function value of $F_n(v, w)$. One or more selection criteria for determining whether the individual function value of $F_n(v, w)$ is better than the incumbent solution $F_n^*$ to $F_n(v, w)$ may include at least one criterion that the individual function value of $F_n(v, w)$ is lower than the incumbent solution $F_n^*$ to $F_n(v, w)$. If that is the case, the individual vector values (v, w) from the individual solution to the minimization problem of $F_n(v, w)$ in expression (1) to which the individual function value of $F_n(v, w)$ becomes the new incumbent solution $(v^*, w^*)$ to the vectors. Otherwise, iterations over α and β factor values continue until all distinct value combinations of the factors α and β are iterated. At the end of the algorithm of FIG. 2, after the iteration loops, the neural network optimization system may be configured to output the incumbent solution $F_n^*$ (to $F_n(v, w)$) and incumbent weight vector values $(v^*, w^*)$ as the optimized solution to the neural network data analysis. In some embodiments, the neural network optimization system is configured to keep track of a distinct value combination of the factors α and β corresponding to the incumbent solution $F_n^*$ (to $F_n(v, w)$), and output the distinct value combination of the factors α and β as a part of the optimized solution to the neural network data analysis. In some embodiments, the neural network optimization system is configured to store at least some of the analytical results in one or more tangible storage media. For example, at least some of the final incumbent weight vector values $(v^*, w^*)$, the final incumbent solution $F_n^*$ (to $F_n(v, w)$), and the corresponding factor values for the factors α and β may be stored in the media by the neural network optimization system. The stored information may be updated, deleted, or retrieved from the media to analyze or make predictions relative to new datasets, other than the target data that is used to generate the weight values and output biases values in final incumbent weight vector values $(v^*, w^*)$.

As can be seen above, techniques as described herein can be used to detect and quantify linear relationships and/or complex non-linear relationships in target data (e.g., a labeled dataset, a training dataset, an observation dataset, etc.) efficiently and automatically. These relationships can be relatively accurately represented in a neural-network based data analysis model, specified with optimized model parameters and functions including but not limited to weights, biases, activation functions, etc. Subsequently, the neural network based data analysis model may be used in one or more of a wide variety of data analysis applications including but not limited to grain production prediction, optical character recognition, image analysis, etc. For example, new (e.g., unlabeled) input dataset may be provided as input to the data analysis model. With the optimized weights and biases, the data analysis model can relatively accurately generate or predict corresponding output dataset based on the input dataset.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
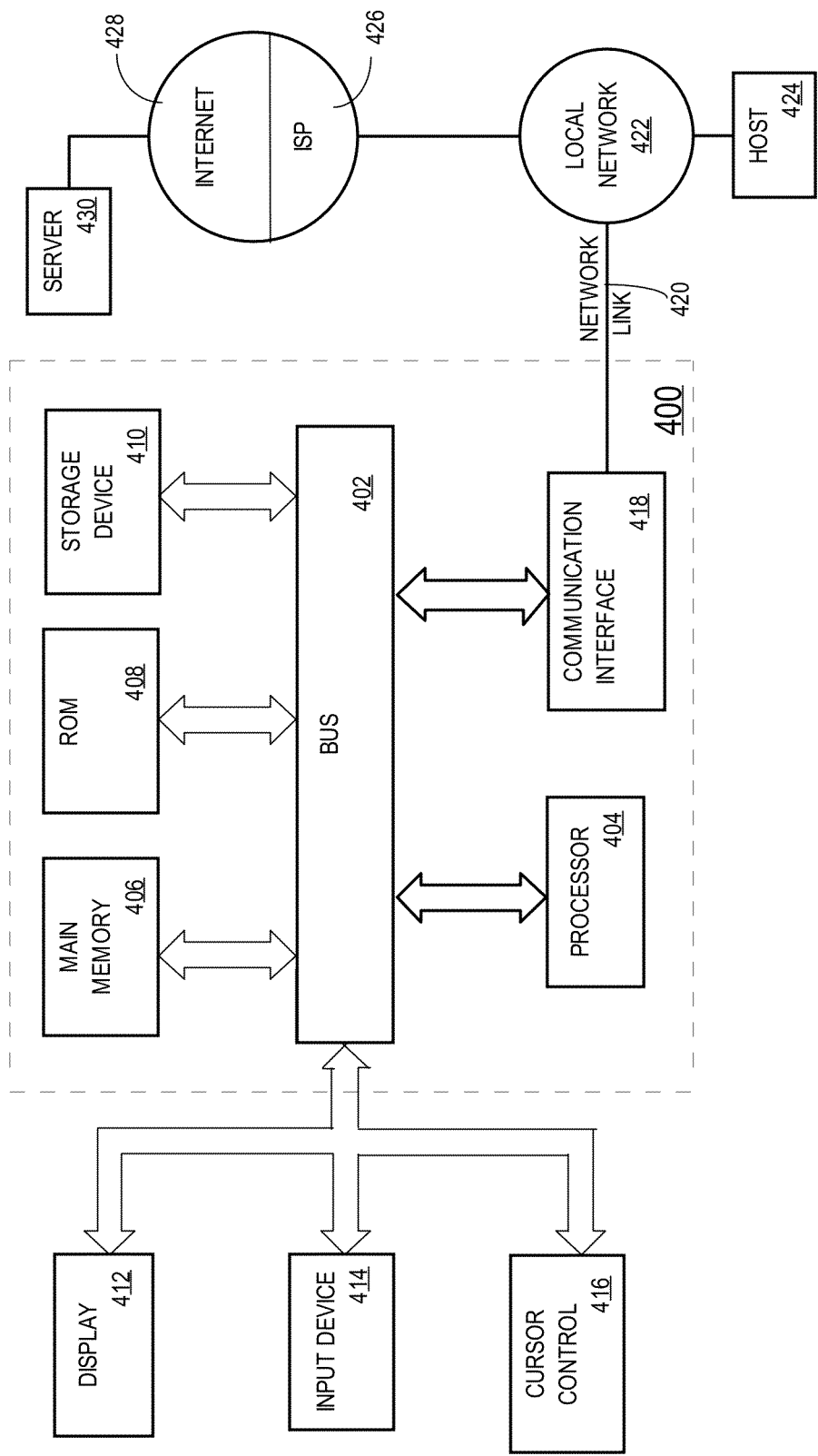
FIG. 4 is a block diagram illustrating a computer system on which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving target data comprising a plurality of observations, wherein each observation in said plurality of observation comprises (a) one or more values of one or more input neurons in a neural network and (b) one or more corresponding values of one or more output neurons in the neural network, and wherein the neural network comprises one or more layers of hidden neurons, one or more skip-layer connections between the one or more input neurons and the one or more output neurons, and one or more non-skip-layer connections between neurons of the neural network;
determining an overall objective function that comprises (a) a first part corresponding to linear regression, (b) a second part corresponding to an unregularized objective function of the nueral network, and (c) a third part corresponding to a regularization of said unregularized objective function; and
determining, based at least in part on said target data and said overall objective function, an overall optimized first vector value of a first vector and an overall optimized second vector value of a second vector, wherein said first vector comprises a set of skip-layer weights for the one or more skip-layer connections and a set of output neuron biases, and wherein said second vector comprises a set of non-skip-layer weights for the one or more non-skip-layer connections;
wherein the method is performed by one or more computing devices.

2. The method of claim 1, wherein said first part of said objective function comprises a L2 norm as multiplied by a complement of an alpha factor, and wherein said second part of said objective function comprises an unregularized neural network objective function as multiplied by said alpha factor.

3. The method of claim 2, wherein said third part of said objective function represents a quadratic regularization expression with the one or more non-skip-layer weights as arguments, as multiplied by a beta factor, and wherein said determining, based at least in part on said target data and said overall objective function, a first vector value of a first vector and a second vector value of a second vector comprises:
initializing said first vector to an incumbent first vector value determined with only said first part of said objective function;
initializing said second vector to an incumbent second vector value within bound box constraints represented by a lower bound L and an upper bound U;
estimating, based on said incumbent first vector value of said first vector and said incumbent second vector value of said second vector, a minimum eigenvalue of a Hessian matrix comprising second derivatives of said unregularized objective function in said second part of said overall objective function;
determining, based at least in part on said minimum eigenvalue of said Hessian matrix, an upper bound for said beta factor in said third part of said objective function;
determining a plurality of vector value combinations of said first vector and said second vector by minimizing, based on said target data without de-trending preprocessing, said overall objective function for a plurality of distinct factor value combinations of said alpha factor and said beta factor;
wherein each distinct factor value combination in the plurality of distinct factor value combinations comprises a distinct combination of an alpha factor value of said alpha factor between zero (0) and one (1), inclusive, and a beta factor value of said beta factor between zero (0) and said upper bound of said beta factor, inclusive;
wherein each vector value combination in the plurality of vector values combinations comprises a first vector value of said first vector and a second vector value of said second vector; and
selecting, based on one or more selection criteria, a particular vector value combination among the plurality of vector value combinations as an overall optimized vector value combination, wherein said overall optimized vector value combination comprises said overall optimized first vector value and said overall optimized second vector value.

4. The method of claim 3, wherein said minimum eigenvalue of said Hessian matrix is numerically estimated without an explicit functional form of said Hessian matrix in terms of weights and biases of the neural network.

5. The method of claim 3, wherein said minimum eigenvalue of said Hessian matrix is computed from an explicit functional form of said Hessian matrix in terms of weights and biases of the neural network.

6. The method of claim 1, wherein said unregularized objective function in said second part of said objective function is explicitly derived from (a) a configuration of the neural network and (b) a plurality of activation functions associated with the one or more hidden neurons and with the one or more output neurons.

7. The method of claim 1, wherein said set of non-skip layer weights were projected into bound box constraints represented by a lower bound vector L and an upper bound vector U.

8. The method of claim 1, wherein said neural network is a feed-forward neural network.

9. The method of claim 1, wherein at least one of a plurality of activation functions in said neural network is one of a tan, bipolarSigmoid, cos, gaussian, gompertz, linear, sigmoid, reciprocal, sin, square, or tan h.

10. The method of claim 1, wherein said overall optimized first vector value and said overall optimized second vector value corresponds to an overall minimum value of said unregularized objective function among a plurality of values of said unregularized objective function, and wherein each value in the plurality of values of said unregularized objective function is obtained through minimizing said overall objective function.

11. One or more non-transitory computer-readable media storing instructions which, when executed by one or more processors, cause:
receiving target data comprising a plurality of observations, wherein each observation in said plurality of observation comprises (a) one or more values of one or more input neurons in a neural network and (b) one or more corresponding values of one or more output neurons in the neural network, and wherein the neural network comprises one or more layers of hidden neurons, one or more skip-layer connections between the one or more input neurons and the one or more output neurons, and one or more non-skip-layer connections between neurons of the neural network;

determining an overall objective function that comprises (a) a first part corresponding to linear regression, (b) a second part corresponding to an unregularized objective function of the neural network, and (c) a third part corresponding to a regularization of said unregularized objective function; and determining, based at least in part on said target data and said overall objective function, an overall optimized first vector value of a first vector and an overall optimized second vector value of a second vector, wherein said first vector comprises a set of skip-layer weights for the one or more skip-layer connections and a set of output neuron biases, and wherein said second vector comprises a set of non-skip-layer weights for the one or more non-skip-layer connections.

12. The one or more media of claim 11, wherein said first part of said objective function comprises a L2 norm as multiplied by a complement of an alpha factor, and wherein said second part of said objective function comprises an unregularized neural network objective function as multiplied by said alpha factor.

13. The one or more media of claim 12, wherein said third part of said objective function represents a quadratic regularization expression with the one or more non-skip-layer weights as arguments, as multiplied by a beta factor, and wherein said determining, based at least in part on said target data and said overall objective function, a first vector value of a first vector and a second vector value of a second vector comprises:

initializing said first vector to an incumbent first vector value determined with only said first part of said objective function;

initializing said second vector to an incumbent second vector value within bound box constraints represented by a lower bound L and an upper bound U;

estimating, based on said incumbent first vector value of said first vector and said incumbent second vector value of said second vector, a minimum eigenvalue of a Hessian matrix comprising second derivatives of said unregularized objective function in said second part of said overall objective function;

determining, based at least in part on said minimum eigenvalue of said Hessian matrix, an upper bound for said beta factor in said third part of said objective function;

determining a plurality of vector value combinations of said first vector and said second vector by minimizing, based on said target data without de-trending preprocessing, said overall objective function for a plurality of distinct factor value combinations of said alpha factor and said beta factor;

wherein each distinct factor value combination in the plurality of distinct factor value combinations comprises a distinct combination of an alpha factor value of said alpha factor between zero (0) and one (1), inclusive, and a beta factor value of said beta factor between zero (0) and said upper bound of said beta factor, inclusive;

wherein each vector value combination in the plurality of vector values combinations comprises a first vector value of said first vector and a second vector value of said second vector; and selecting, based on one or more selection criteria, a particular vector value combination among the plurality of vector value combinations as an overall optimized vector value combination, wherein said overall optimized vector value combination comprises said overall optimized first vector value and said overall optimized second vector value.

14. The one or more media of claim 13, wherein said minimum eigenvalue of said Hessian matrix is numerically estimated without an explicit functional form of said Hessian matrix in terms of weights and biases of the neural network.

15. The one or more media of claim 13, wherein said minimum eigenvalue of said Hessian matrix is computed from an explicit functional form of said Hessian matrix in terms of weights and biases of the neural network.

16. The one or more media of claim 11, wherein said unregularized objective function in said second part of said objective function is explicitly derived from (a) a configuration of the neural network and (b) a plurality of activation functions associated with the one or more hidden neurons and with the one or more output neurons.

17. The one or more media of claim 11, wherein said set of non-skip layer weights were projected into bound box constraints represented by a lower bound vector L and an upper bound vector U.

18. The one or more media of claim 11, wherein said neural network is a feed-forward neural network.

19. The one or more media of claim 11, wherein at least one of a plurality of activation functions in said neural network is one of a tan, bipolarSigmoid, cos, gaussian, gompertz, linear, sigmoid, reciprocal, sin, square, or tan h.

20. The one or more media of claim 11, wherein said overall optimized first vector value and said overall optimized second vector value corresponds to an overall minimum value of said unregularized objective function among a plurality of values of said unregularized objective function, and wherein each value in the plurality of values of said unregularized objective function is obtained through minimizing said overall objective function.

* * * * *